US008005606B2

(12) United States Patent
Ono

(10) Patent No.: US 8,005,606 B2
(45) Date of Patent: Aug. 23, 2011

(54) IDLE CONTROL SYSTEM OF DIRECT-CYLINDER-FUEL-INJECTION SPARK-IGNITION ENGINE

(75) Inventor: Masashi Ono, Sagamihara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 437 days.

(21) Appl. No.: 12/331,147

(22) Filed: Dec. 9, 2008

(65) Prior Publication Data

US 2009/0151693 A1    Jun. 18, 2009

(30) Foreign Application Priority Data

Dec. 12, 2007    (JP) ................................. 2007-320818

(51) Int. Cl.
*G06F 19/00*    (2011.01)
*F02P 5/15*    (2006.01)
*F01N 3/10*    (2006.01)
*F02M 3/00*    (2006.01)

(52) U.S. Cl. ................... 701/110; 701/103; 123/339.12; 60/274; 60/285

(58) Field of Classification Search ............. 123/339.11, 123/339.12, 339.14, 339.16, 361, 399, 403; 701/101–103, 110, 113, 115; 60/274, 277, 60/284, 285
See application file for complete search history.

(56) References Cited

U.S. PATENT DOCUMENTS

| 5,778,662 | A  | * | 7/1998  | Mori et al. ...................... 60/274 |
| 6,212,879 | B1 | * | 4/2001  | Nishimura et al. ............. 60/274 |
| 6,253,866 | B1 | * | 7/2001  | Kojima ..................... 180/65.235 |
| 6,453,664 | B2 | * | 9/2002  | Ishii et al. ....................... 60/285 |
| 7,025,039 | B2 | * | 4/2006  | Bidner et al. ............ 123/339.11 |
| 7,832,195 | B2 | * | 11/2010 | Takahashi ...................... 60/284 |

FOREIGN PATENT DOCUMENTS

| JP | 2003193895 A | * | 7/2003 |
| JP | 2005-105963 |  | 4/2005 |

\* cited by examiner

*Primary Examiner* — Willis R Wolfe, Jr.
(74) *Attorney, Agent, or Firm* — Drinker Biddle & Reath LLP

(57) ABSTRACT

When a predetermined operation state during idling is set, an ignition timing is set to a basic ignition timing at or following a compression top dead center point, and a temperature rise controlling operation is carried out for injecting fuel prior to the basic ignition timing. Then, a target value of an intake air quantity is set in accordance with an engine request torque that is set when controlling a temperature rise. Thereafter, a limit value of the intake air quantity that is set when controlling the temperature rise is set. When the target value of the intake air quantity is less than the limit value, the intake air quantity is adjusted so as to become the target value, whereas, when the target value is greater than the limit value, the intake air quantity is adjusted so as to become the limit value. Further, when the target value of the intake air quantity is less than the limit value, the ignition timing is fixed to the basic ignition timing, whereas, when the target value is greater than the limit value, the ignition timing is corrected towards a spark advance side from the basic ignition timing on the basis of insufficient air quantity.

18 Claims, 4 Drawing Sheets

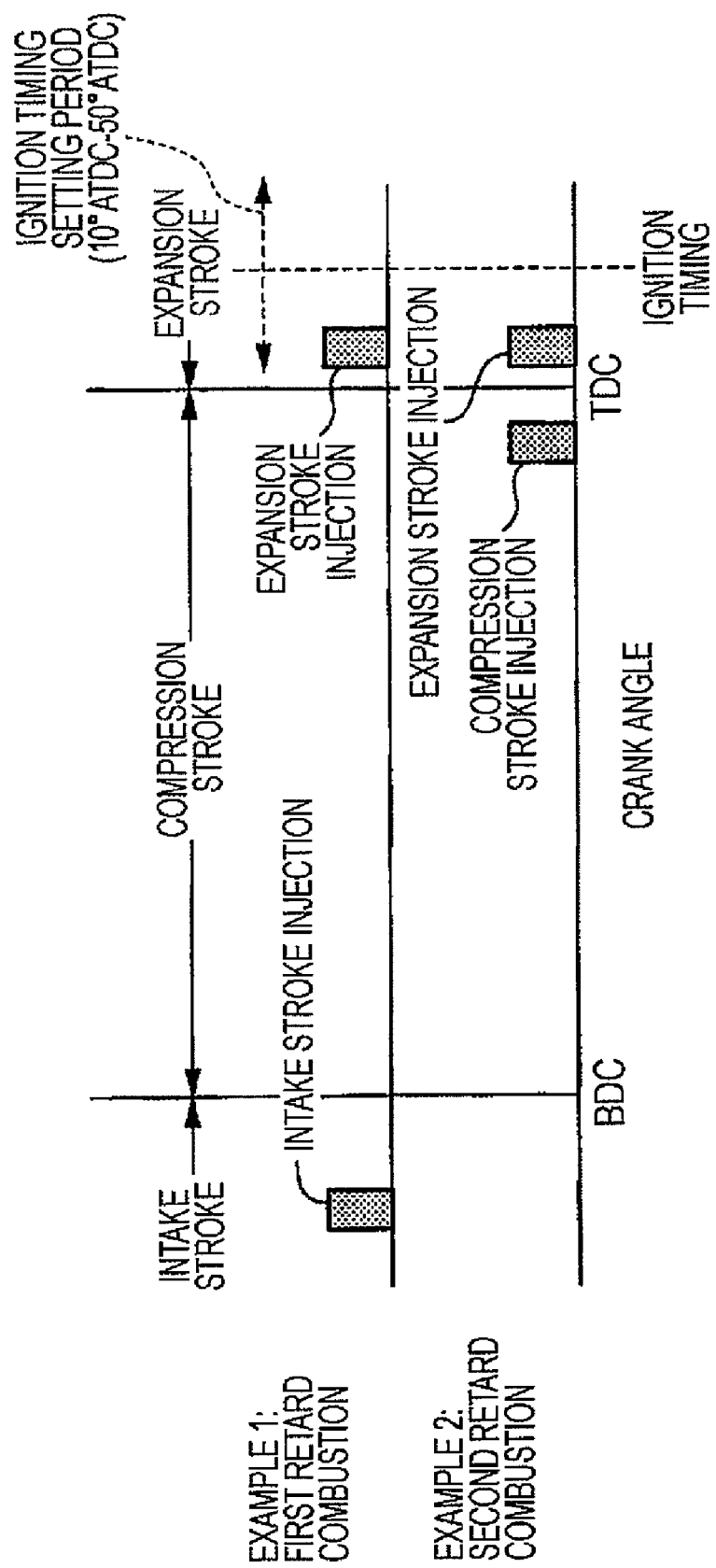

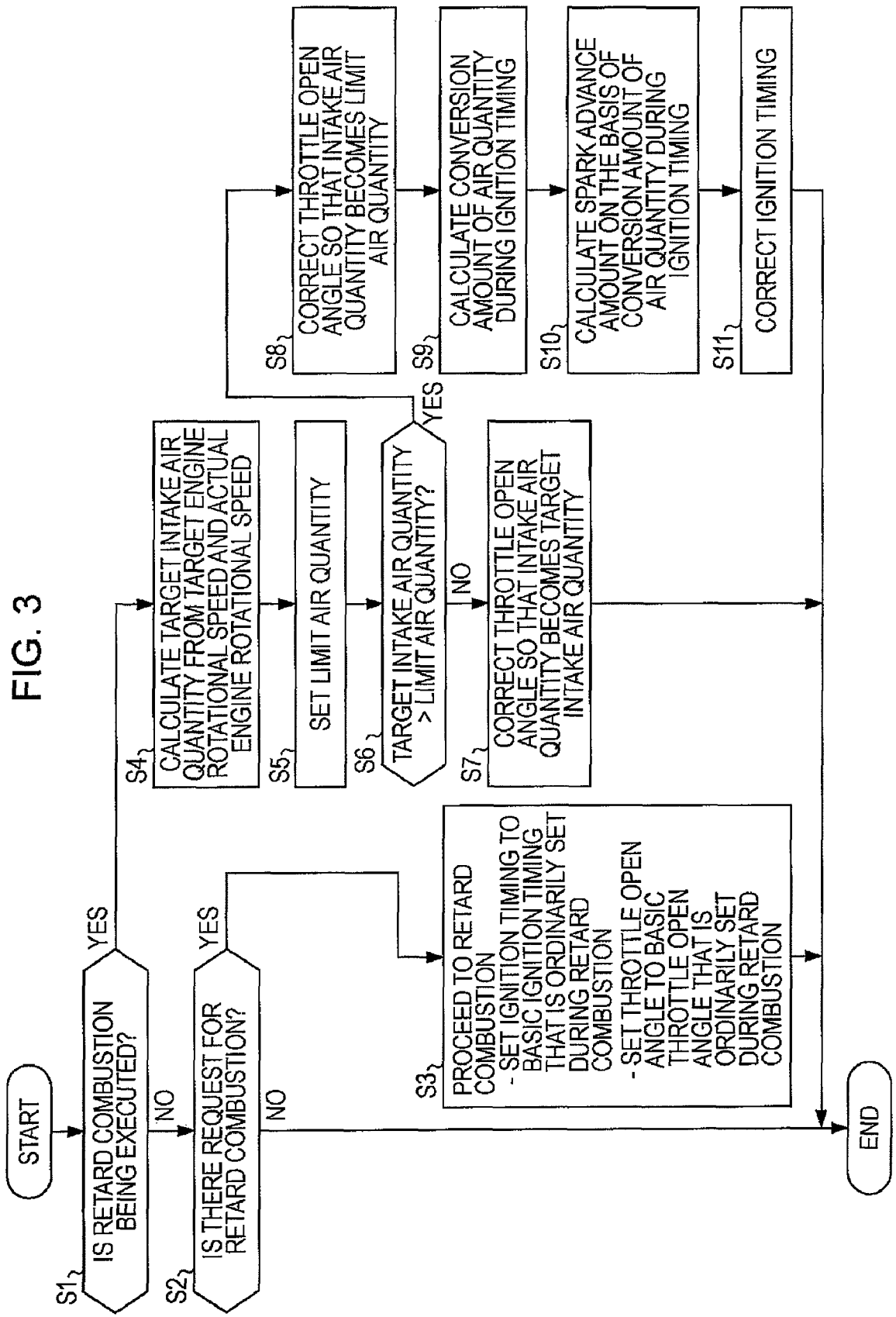

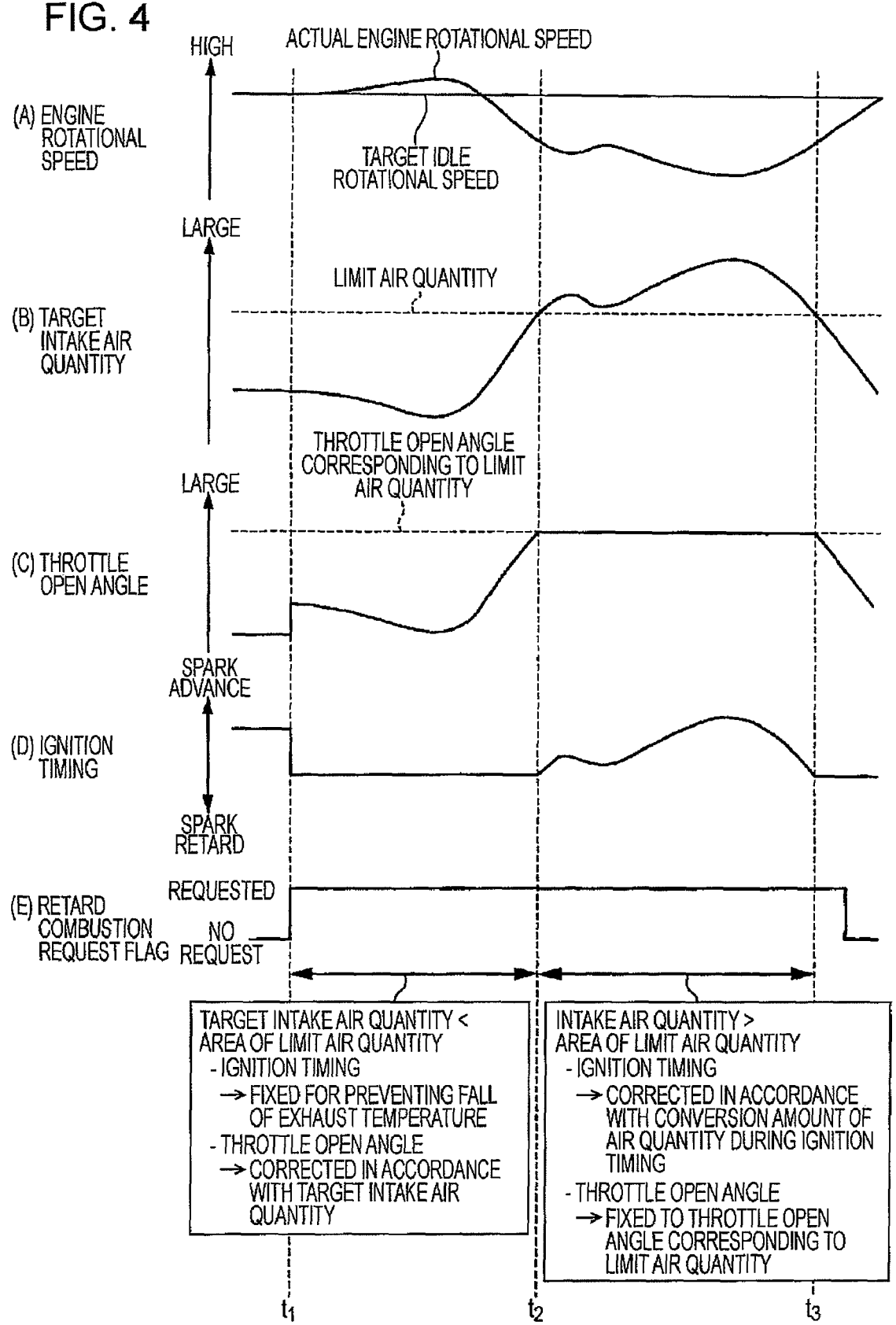

IDLE CONTROL SYSTEM OF DIRECT-CYLINDER-FUEL-INJECTION SPARK-IGNITION ENGINE

This application claims priority under 35 U.S.C. §119 to Japanese Patent Application No. 2007-320818, filed on Dec. 12, 2007, which is incorporated by reference herein in its entirety.

FIELD OF THE INVENTION

The present invention relates generally to an idle controlling device of a direct-cylinder-fuel-injection spark-ignition engine.

BACKGROUND OF THE INVENTION

In a related art idle controlling device of an engine, to activate a catalyst at an early stage when the engine is cold, an ignition timing is controlled to be retarded, and an intake air quantity is controlled, so that feedback control is performed for setting the rotational speed of the engine to a target idle rotational speed.

However, the above-described related art idle controlling device of the engine controls engine torque so that the rotational speed of the engine becomes the target idle rotational speed while correcting the ignition timing and the intake air quantity at the same time. For providing torque, when the ignition timing is advanced, an exhaust temperature is reduced, whereas, when the intake air quantity is increased, the exhaust temperature is increased. Therefore, when the ignition timing and the intake air quantity are corrected at the same time, it is difficult to adjust to a suitable exhaust temperature when the engine is cold.

SUMMARY OF THE INVENTION

An object of the invention to is to facilitate adjustment of an exhaust temperature when an engine is cold.

In an embodiment, the invention provides a control system of an engine, including an intake air quantity adjusting device for adjusting an intake air quantity of the engine, an igniting device for igniting a fuel supplied to the engine, a catalyst included in an exhaust system of the engine, and a controller configured to control the intake air quantity adjusting device and the igniting device. The controller:

sets an ignition timing of the igniting device to a basic ignition timing at or following a compression top dead center time when the engine is operating in an idle state and a request is made to raise a temperature of the catalyst;

calculates a target value of the intake air quantity in accordance with an engine request torque when the ignition timing of the igniting device is set to the basic ignition timing;

calculates a limit value of the intake air quantity in accordance with a rate of increase of exhaust temperature for preventing the exhaust temperature from rising excessively;

compares the target intake air quantity with the limit intake air quantity;

controls the intake air quantity adjusting device so that the intake air quantity becomes the target value when the target value is less than the limit value and while the ignition timing is set to the basic ignition timing; and sets the ignition timing towards a spark advance side from the basic ignition timing based on a difference between the target value and the limit value when the target value is greater than the limit value and while the intake air quantity adjusting device is controlled to set the intake air quantity to become the limit value.

In another embodiment, the invention provides an idle control system of an engine, including intake air quantity adjusting means for adjusting an intake air quantity of the engine, temperature rise controlling means for setting an ignition timing to a basic ignition timing at or following a compression top dead center time, and for setting a fuel injection timing following the compression top dead center time and before the basic ignition timing, when the engine is operating in an idle state and a request is made to raise a temperature of a catalyst, target intake air quantity setting means for calculating an engine request torque and setting a target value of the intake air quantity in accordance with the engine request torque, limit value setting means for setting an upper limit value of the intake air quantity that is set to prevent an excessive rise in exhaust temperature, intake air quantity controlling means for controlling the intake air quantity adjusting means so that the intake air quantity becomes the target value when the target value is less than the limit value in controlling the temperature rise, and for controlling the intake air quantity adjusting means so that the intake air quantity becomes the limit value when the target value is greater than the limit value in controlling the temperature rise, and ignition timing controlling means for setting the ignition timing to be the basic ignition timing when the target value is less than the limit value in controlling the temperature rise, and for correcting the ignition timing towards a spark advance side from the basic ignition timing on the basis of insufficient air quantity when the target value is greater than the limit value in controlling the temperature rise.

In yet another embodiment, the invention provides a method of controlling an engine system, the engine system including an intake air quantity adjusting device for adjusting an intake air quantity of the engine, an igniting device for igniting a fuel supplied to the engine, a catalyst included in an exhaust system of the engine, and a controller configured to control the intake air quantity adjusting device and the igniting device. The method includes setting an ignition timing of the igniting device to a basic ignition timing at or following a compression top dead center time when the engine is operating in an idle state and a request is made to raise a temperature of the catalyst, calculating a target value of the intake air quantity in accordance with an engine request torque when the ignition timing of the igniting device is set to the basic ignition timing, calculating a limit value of the intake air quantity in accordance with a rate of increase of exhaust temperature for preventing the exhaust temperature from rising excessively;

comparing the target intake air quantity with the limit intake air quantity;

controlling the intake air quantity adjusting device so that the intake air quantity becomes the target value when the target value is less than the limit value and while the ignition timing is set to the basic ignition timing; and setting the ignition timing towards a spark advance side from the basic ignition timing based on a difference between the target value and the limit value when the target value is greater than the limit value and while the intake air quantity adjusting device is controlled to set the intake air quantity to become the limit value.

According to an embodiment of the present invention, a controlling operation is carried out as follows. That is, during an idle operation and an operation state in which a request is made to raise the temperature of the catalyst, in general, the ignition timing is fixed to the basic ignition timing at or following the compression top dead center point, and, until the target intake air quantity becomes greater than the limit value, the intake air quantity is controlled so that the rotational speed of the engine becomes a target idle rotational speed. In contrast, when the target intake air quantity becomes greater than the limit value, the intake air quantity is fixed to the limit value, to exceptionally control the ignition timing, so that the rotational speed of the engine is controlled so as to become the target idle rotational speed. By basically controlling either one of the intake air quantity and the ignition timing to control the engine torque so that the rotational speed of the engine becomes the target idle rotational speed, it is possible to facilitate the controlling of the exhaust temperature.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 2 shows two examples of retard combustion;

FIG. 3 is a flowchart of idle controlling during the retard combustion; and

FIG. 4 is a time chart of the steps of the idle controlling during the retard combustion.

DETAILED DESCRIPTION OF THE PREFERRED EMBODIMENTS

Figure 1:
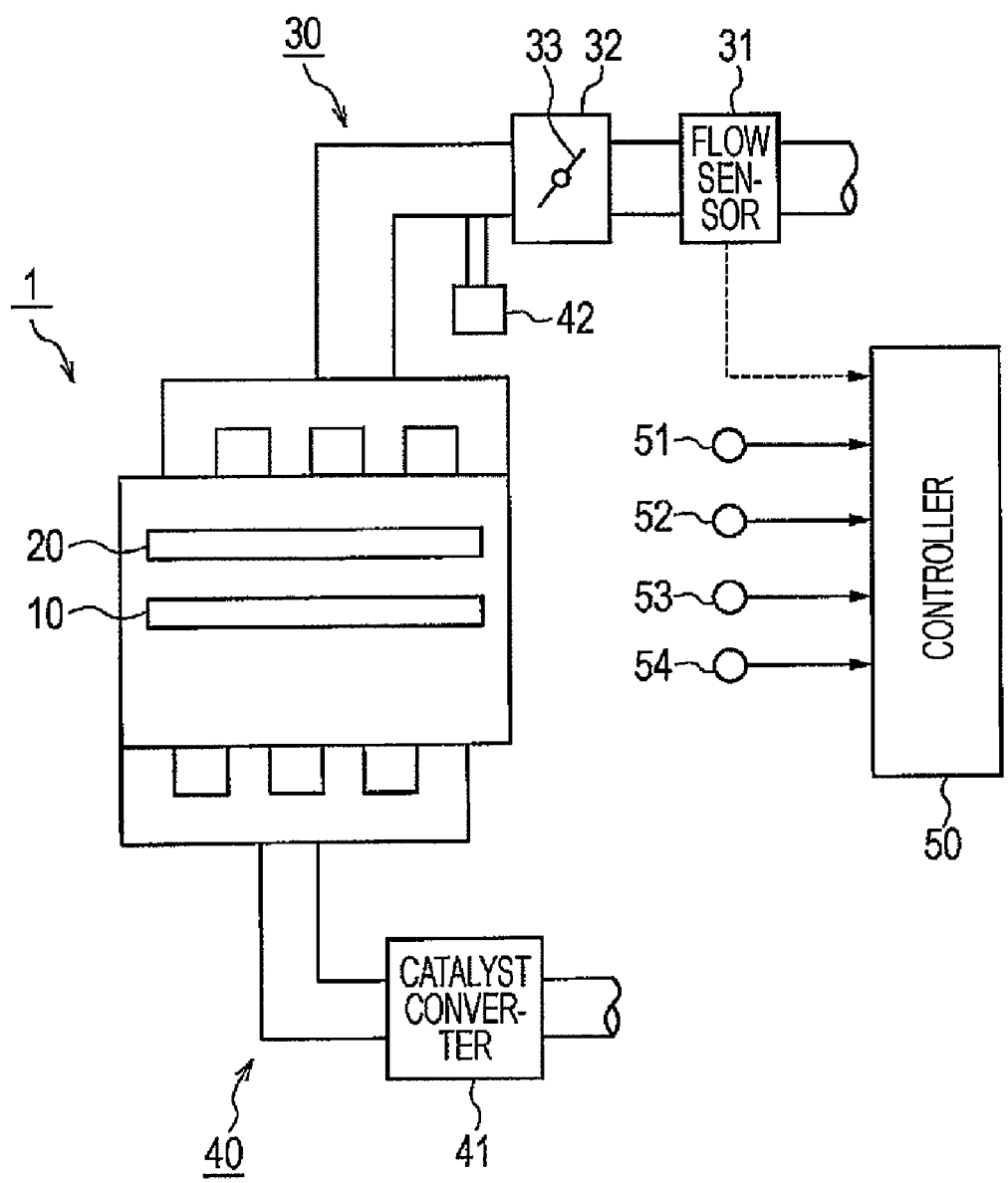
FIG. 1 shows a system of a controlling device of a direct-cylinder-fuel-injection spark-ignition engine.

FIG. 1 shows a system of a controlling device of a direct-cylinder-fuel-injection spark-ignition engine (hereunder referred to as "engine") 1 according to an embodiment of the present invention.

An engine 1 includes an ignition device 10, a fuel injection device 20, an intake path 30, and an exhaust path 40. The ignition device 10 ignites a mixture compressed in each cylinder. The fuel injection device 20 directly injects fuel into each cylinder. The intake path 30 is a path for supplying air to each cylinder. From an upstream side, the intake path 30 is provided with an air flow sensor 31 and an electronic control throttle 32 in that order. The air flow sensor 31 detects an intake air quantity of the engine 1. The electronic control throttle 32 drives a throttle valve 33 on the basis of a control signal from a controller 50 (described in more detail later), to control a throttle opening in accordance with an operation state. The exhaust path 40 is a path for exhausting exhaust gas (such as combustion gas or air) generated in each cylinder. The exhaust path 40 is provided with a catalytic converter 41. The catalytic converter 41 removes harmful substances, such as hydrocarbons or nitrogen oxide, in the exhaust.

The controller 50 is a microcomputer including a central processing unit (CPU), a read only memory (ROM), a random access memory (RAM), and an input/output interface (I/O interface). In addition to a signal from the air flow sensor 31, signals from, for example, a water temperature sensor 51, a crank angle sensor 52, and an idle switch 53 are input to the controller 50.

The water temperature sensor 51 detects the water temperature of the engine 1. The crank angle sensor 52 detects the rotational speed of the engine and a reference position of each cylinder. The crank angle sensor 52 outputs a position signal (hereunder referred to as "POS signal") with each unit rotational angle of a crank shaft. The crank angle sensor 52 also outputs a reference signal (hereunder referred to as "REF signal") at a reference position of the crank shaft. The controller 50 calculates the ignition timing and the fuel injection timing on the basis of, for example, the POS signal and the REF signal.

The idle switch 53 detects whether or not the engine 1 is in idle operation as a result of an output when an accelerator pedal is not used.

For reducing the exhaust density of hydrocarbons and for activating a catalyst at an early stage when the engine is cold, it is effective to retard the ignition timing. For greater effect, ignition is performed at and following the compression top dead center point (hereunder referred to as "ATDC" ignition).

Accordingly, in an embodiment, during idle operation when the engine is cold, the ignition timing is set at or following the compression top dead center point, and a temperature rise control operation (hereunder referred to as "retard combustion") for injecting fuel prior to the ignition timing is carried out. The fuel injection timing and the ignition timing of retard combustion will hereunder be described with reference to FIG. 2.

FIG. 2 shows two examples of retard combustion according to an embodiment.

The ignition timing of a retard combustion in a first example (hereunder referred to as "first retard combustion") is set from 10° ATDC to 50° ATDC following the compression top dead center point. The fuel combustion timing is set in an intake stroke and an expansion stroke, so that fuel is separately injected twice. Among the two fuel injections performed separately, the fuel injection in the expansion stroke is carried out immediately prior to the ignition.

The ignition timing of a retard combustion in a second example (hereunder referred to as "second retard combustion") is set from 10° ATDC to 50° ATDC as in the first retard combustion. The fuel combustion timing is set in a compression stroke and an expansion stroke, so that fuel is separately injected twice. In this case too, among the fuel injections separately performed twice, the fuel injection in the expansion stroke is carried out immediately prior to the ignition.

In this way, by setting the ignition timing from 10° ATDC to 50° ATDC, and considerably retarding the ignition timing, a sufficient after-burning effect can be obtained for reducing the exhaust density of hydrocarbons and for activating a catalyst at an early stage. In other words, some fuel remains and travels with the exhaust to the catalytic converter. The catalytic converter is hot enough to cause the fuel to combust, which causes the temperature of the catalytic converter to increase and facilitates reduction of the hydrocarbons.

For stabilizing the combustion during the ATDC ignition, the combustion period needs to be reduced. Therefore, it is necessary to increase the combustion speed (that is, flaming speed) by increasing cylinder turbulence. The cylinder turbulence can be generated/increased by fuel-spray energy that is injected at a high pressure into each cylinder. When the fuel and/or air is injected into the cylinder, the molecules move very fast in response to the fast influx of the high pressure air/fuel, thereby causing the contents of the cylinder to become turbulent. Turbulent fuel/air mixtures burn faster than non-turbulent mixtures.

For the first retard combustion, the cylinder turbulence that is generated by the first fuel injection performed in the intake stroke is weakened at the latter half of the compression stroke. Therefore, the injection almost never influences an increase of the cylinder turbulence following the compression top dead center point. Since the period from the first fuel injection to the ignition timing is comparatively long, the injection fuel provided when the first fuel injection is carried out can be spread over an entire combustion chamber. In contrast, since the second fuel injection performed in the expansion stroke is carried out immediately prior to the ignition timing, the cylinder turbulence is generated/increased by the second fuel injection.

In this way, according to the first retard combustion, even if the ignition timing is considerably retarded, fuel is injected immediately prior to the ignition timing, to increase the cylinder turbulence, thereby increasing the combustion speed. Therefore, it is possible to stabilize the combustion. In addition, since the first fuel injection is carried out during the intake stroke, the injection fuel can be spread over the entire combustion chamber. Therefore, compared to the second retard combustion described later, it is possible to more stably carry out the combustion.

For the second retard combustion, the cylinder turbulence generated by the first fuel injection performed during the compression stroke is gradually weakened at, and following, the compression top dead center point. However, for the second retard combustion, the second fuel injection is carried out during the expansion stroke following the compression top dead center point where the cylinder turbulence generated by the first fuel injection remains. Therefore, the cylinder turbulence that is generated by the first fuel injection can be increased.

In this way, according to the second retard combustion, even if the ignition timing is considerably retarded, fuel is injected immediately prior to the ignition timing, to increase the cylinder turbulence, thereby increasing the combustion speed. Therefore, it is possible to stabilize the combustion.

During idle operation, regardless of whether the combustion method is an ordinary stratified combustion method, an ordinary homogeneous combustion method, or a retard combustion method, a throttle opening of the electronic control throttle 32 is subjected to feedback control so that the rotational speed of the engine becomes a target idle rotational speed. The term "ordinary stratified combustion" refers to a lean combustion that is carried out by injecting fuel during the compression stroke and igniting the gas mixture before the compression top dead center point while the fuel is unevenly distributed near the ignition device 10. The term "homogeneous combustion" refers to combustion that is performed by injecting fuel during the intake stroke and forming a gas mixture having a uniform air-fuel ratio, to perform ignition.

When the retard combustion is carried out, the engine torque is reduced due to retarding the ignition timing. Therefore, when the retard combustion is performed during an idle operation, the air quantity supplied into the cylinders is increased, to prevent the reduction of the engine torque. Therefore, the throttle valve 33 of the electronic control throttle 32 is opened.

Here, in the case in which the retard combustion is carried out, when a load torque is input to the engine from a vehicle auxiliary device, such as a compressor that compresses a refrigerant of an air conditioner or a power steering pump of a hydraulic power steering device that reduces a steering-wheel operational force, the following problems arise.

That is, when the rotational speed of the engine is reduced as a result of inputting a load torque to an engine from the vehicle auxiliary device, the air quantity is increased and corrected for controlling the rotational speed of the engine to a target idle rotational speed. When the air quantity is increased, the fuel injection amount increases accordingly, thereby also increasing the exhaust temperature. When the retard combustion is carried out, the air quantity is already increased. Therefore, in the case in which the load torque from the vehicle auxiliary device is input to thereby further increase the air quantity, when the increased air quantity is large, the exhaust temperature is abnormally increased. Consequently, problems, such as the temperature of a catalyst, provided in an exhaust system, increasing excessively occurs.

When, to overcome such problems, an attempt is made to control the exhaust temperature by adjusting the air quantity and the ignition timing at the same time so that the exhaust temperature can be increased as quickly as possible, the controlling operation becomes difficult to carry out.

Therefore, in an embodiment, when a limit value is set for the intake air quantity (limit air quantity), and the rotational speed of the engine is reduced as a result of inputting a load torque from, for example, a vehicle auxiliary device, the following operations are carried out. That is, first, a controlling operation is carried out so that the rotational speed of the engine becomes a target idle rotational speed, by increasing the air quantity. Then, when the intake air quantity reaches the limit value (limit air quantity), the ignition timing is advanced without increasing the air quantity to a value greater than or equal to the limit value (limit air quantity). This causes the rotational speed of the engine to be controlled to a target idle rotational speed by increasing the engine torque. The idle controlling during the retard combustion will be described below.

FIG. 3 is a flowchart of the idle controlling during the retard combustion according to an embodiment. The controller 50 repeatedly executes a routine thereof in a predetermined computation period.

In Step S1, the controller 50 determines whether or not retard combustion is being executed. That is, the controller 50 determines whether the current combustion method is a retard combustion method, an ordinary stratified combustion method, or an ordinary homogeneous combustion method. When the controller 50 determines that the retard combustion is not being executed, the process proceeds to Step S2. If it determines that the retard combustion is being executed, the process proceeds to Step S4.

In Step S2, the controller 50 determines whether or not there is a request for the retard combustion. That is, the controller 50 determines whether or not there is a request for raising the temperature of a catalyst at an early stage by the catalytic converter 41 during an idle operation after the rotational speed of the engine reaches a predetermined rotational speed. More specifically, the controller 50 determines whether or not the rotational speed of the engine has reached the predetermined rotational speed, whether or not the water temperature of the engine is less than a predetermined temperature, and whether or not there is an output from the idle switch 53. When the controller 50 determines that the rotational speed of the engine is greater than the predetermined rotational speed, the water temperature of the engine is less than the predetermined temperature, and there is an output from the idle switch 53, the process proceeds to Step S3. Otherwise, the current process is ended.

In Step S3, the controller 50 causes the combustion method to shift to the retard combustion method. In an embodiment, the combustion method shifts to the first retard combustion. More specifically, the ignition timing is set to a previously set basic ignition timing for the retard combustion following the compression top dead center point. In addition, fuel is injected in the expansion stroke and in the intake stroke prior to the basic ignition timing. Further, a throttle opening is set to a previously set basic throttle opening for the retard combustion.

In Step S4, for the purpose of maintaining the rotational speed of the engine at the target idle rotational speed, the controller 50 calculates a target value of the intake air quantity (hereunder referred to as "target intake air quantity") required for the engine 1 to generate a required torque, from the rotational speed of the engine and the target idle rotational speed.

In Step S5, for the purpose of preventing the exhaust temperature from rising excessively due to an increase in the intake air quantity, the controller 50 sets a limit value of the intake air quantity (hereunder referred to as "limit air quantity"). In an embodiment, the limit air quantity is a previously set predetermined value.

In Step S6, the controller 50 determines whether or not the target intake air quantity is greater than the limit air quantity. If the controller 50 determines that the target intake air quantity is greater than the limit air quantity, the process proceeds to Step S8. If the controller 50 determines that it is less than the limit air quantity, the process proceeds to Step S7.

In Step S7, the controller 50 drives the throttle valve 33 of the electronic control throttle 32 and corrects the throttle opening so that the intake air quantity becomes the target intake air quantity.

In Step S8, the controller 50 drives the throttle valve 33 of the electronic control throttle 32 and corrects the throttle opening so that the intake air quantity becomes the limit air quantity.

In Step S9, the controller 50 calculates an air quantity corresponding to a difference between the target intake air quantity and the limit air quantity (this difference is hereunder referred to as "conversion amount of air quantity at the ignition timing").

In Step S10, the controller 50 calculates a correction spark advance amount for the ignition timing with reference to a table, on the basis of the conversion amount of air quantity at the ignition timing. The table is previously set on the basis of, for example, an experiment, and is stored in ROM. The larger the conversion amount of air quantity at the ignition timing is, the larger the spark advance amount at the ignition timing. Accordingly, the rotational speed of the engine can be stably maintained at the idle rotational speed when the reduced amount of engine torque resulting from insufficient intake air quantity is compensated by advancing the ignition timing.

In an embodiment, although the ignition advance amount is calculated to set a final ignition timing with respect to the basic ignition timing, the final ignition timing, in which the conversion amount of air quantity at the ignition timing is considered, can be collected from the beginning without setting the basic ignition timing.

In Step S11, the controller 50 advances and corrects the ignition timing on the basis of the correction spark advance amount calculated in Step S9.

FIG. 4 is a time chart of the steps of the idle controlling during the retard combustion according to an embodiment. For clarifying the correspondence with the flowchart of FIG. 3, the step numbers of the flowchart of FIG. 3 will also be given.

When, at a time t1, there is a request for retard combustion ((E) in FIG. 4; "lyes" in Step S2), the ignition timing is retarded, so that the throttle opening is increased accordingly ((C) and (D) in FIG. 4; Step S3).

From the time t1 to a time t2, the target intake air quantity, calculated from the actual rotational speed of the engine and the target idle rotational speed, is less than the limit air quantity ((B) in FIG. 4; "no" in Step S6). Therefore, by controlling the throttle opening, the actual rotational speed of the engine is controlled so as to become the target idle rotational speed ((C) in FIG. 4; Step S7). Then, the ignition timing is fixed to the basic ignition timing during the retard combustion ((D) in FIG. 4).

This makes it possible to activate at an early stage a catalyst as a result of retarding the ignition timing. Since the engine torque is increased by increasing the intake air quantity, the actual rotational speed of the engine can be reliably controlled so as to become the target idle rotational speed.

When, at the time t2, the target intake air quantity becomes greater than the limit air quantity ((B) in FIG. 4; "yes" in Step S6), the throttle opening is fixed to a throttle opening corresponding to the limit air quantity ((C) in FIG. 4; Step S8). On the other hand, the ignition timing which was fixed to the basic ignition timing between the time t1 to the time t2 (during which the target intake air quantity is less than the limit air quantity), is now advanced and corrected starting from t2, to control the actual rotational speed of the engine so as to become the target idle rotational speed ((D) in FIG. 4; Steps S9 to S11).

Accordingly, even if the air quantity is increased as a result of, for example, inputting a load torque, air whose quantity is greater than or equal to the limit air quantity is not sucked into the cylinders. In addition, since the ignition timing is advanced, it is possible to reliably prevent the exhaust temperature from rising excessively. Further, since the engine torque is increased by advancing and correcting the ignition timing, the actual rotational speed of the engine can be reliably controlled so as to become the target idle rotational speed.

When, at a time t3, the target intake air quantity becomes less than the limit air quantity ((B) in FIG. 4), the ignition timing is fixed to the basic ignition timing again ((D) in FIG. 4), and the throttle opening is controlled in accordance with the target intake air quantity. This causes the actual rotational speed of the engine to be controlled so as to become the target idle rotational speed, while inducing activation of a catalyst at an early state by increasing the exhaust temperature ((C) in FIG. 4).

According to an embodiment described above, during the retard combustion in the idle operation, until the target intake air quantity exceeds the limit air quantity, the throttle opening is controlled, to control the rotational speed of the engine so as to become the target idle rotational speed. The ignition timing remains fixed to the basic ignition timing for the retard combustion.

This makes it possible to activate at an early stage the catalyst as a result of retarding the ignition timing. Since the engine torque is increased by increasing the intake air quantity, the actual rotational speed of the engine can be reliably controlled so as to become the target idle rotational speed.

When the target intake air quantity exceeds the limit air quantity, the throttle opening is fixed to a throttle opening corresponding to the limit air quantity. In addition, by advancing and correcting the ignition timing, the rotational speed of the engine is controlled so as to become the target idle rotational speed.

Accordingly, even if the air quantity is increased as a result of, for example, inputting a load torque, air whose quantity is greater than or equal to the limit air quantity is not sucked into the cylinders. In addition, since the ignition timing is advanced, it is possible to reliably prevent the exhaust temperature from rising excessively. Further, since the engine torque is increased by advancing and correcting the ignition timing, the actual rotational speed of the engine can be reliably controlled so as to become the target idle rotational speed.

Accordingly, either one of the throttle opening and the ignition timing is controlled in accordance with the target intake air quantity, to control the rotational speed of the engine so as to become the target idle rotational speed. Therefore, the exhaust temperature can be easily controlled.

In an embodiment, the limit air quantity is a previously set predetermined value, however it may also be variable in accordance with the operation state. For example, the limit air quantity may be varied in accordance with a request exhaust temperature. In this case, the higher the request exhaust temperature that is set on the basis of, for example, the water temperature of the engine, the larger the limit air quantity that is set. The lower the water temperature of the engine (such as when the engine is cold), the higher the request exhaust temperature. This makes it possible to activate a catalyst at an early stage by quickly raising the exhaust temperature.

The limit air quantity may be varied in accordance with a request negative pressure of a brake booster 42 that reduces an operational power of a brake pedal with an intake negative pressure of the engine 1 being used as a servo source. In this case, in accordance with an output from the boost pressure sensor 54, the limit air quantity is set less than or equal to an air quantity (throttle opening) that can produce the request negative pressure of the brake booster 42. That is, the larger the request negative pressure, the smaller the limit air quantity.

Therefore, when a limit value corresponding to the request negative pressure value is less than the throttle opening corresponding to the limit value that is set for preventing the exhaust temperature from rising excessively, the throttle opening is set less than the throttle opening that allows the request negative pressure to be produced, to make it possible to reliably produce the request negative pressure of the brake booster. Therefore, the brake operational force of a driver can be reliably reduced.

In an embodiment, during the retard combustion, the first retard combustion is carried out, however the second combustion may also be performed.

In the examples in which two retard combustions are performed, the fuel injections are carried out twice. However, the fuel injection may be carried out only once in the compression stroke or the expansion stroke.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A method of controlling an engine system, the engine system including an intake air quantity adjusting device for adjusting an intake air quantity of the engine, an igniting device for igniting a fuel supplied to the engine, a catalyst included in an exhaust system of the engine, and a controller configured to control the intake air quantity adjusting device and the igniting device, the method comprising:

setting an ignition timing of the igniting device to a basic ignition timing at or following a compression top dead center time when the engine is operating in an idle state and a request is made to raise a temperature of the catalyst;

calculating a target value of the intake air quantity in accordance with an engine request torque when the ignition timing of the igniting device is set to the basic ignition timing;

calculating a limit value of the intake air quantity in accordance with a rate of increase of exhaust temperature;

comparing the target intake air quantity with the limit intake air quantity;

controlling the intake air quantity adjusting device so that the intake air quantity becomes the target value when the target value is less than the limit value and while the ignition timing is set to the basic ignition timing; and setting the ignition timing towards a spark advance side from the basic ignition timing based on a difference between the target value and the limit value when the target value is greater than the limit value and while the intake air quantity adjusting device is controlled to set the intake air quantity to become the limit value.

2. A control system of an engine, comprising:

an intake air quantity adjusting device for adjusting an intake air quantity of the engine;

an igniting device for igniting a fuel supplied to the engine;

a catalyst included in an exhaust system of the engine; and a controller configured to control the intake air quantity adjusting device and the igniting device, wherein the controller:

sets an ignition timing of the igniting device at or following a compression top dead center time when the engine is operating in an idle state and a request is made to raise a temperature of the catalyst;

calculates a target value of the intake air quantity in accordance with an engine request torque;

calculates a limit value of the intake air quantity in accordance with a rate of increase of exhaust temperature;

compares the target intake air quantity with the limit intake air quantity;

controls the intake air quantity adjusting device so that the intake air quantity becomes the target value when the target value is less than the limit value; and advances the ignition timing based on a difference between the target value and the limit value when the target value is greater than the limit value and while the intake air quantity adjusting device is controlled to set the intake air quantity to become the limit value.

3. A control system of an engine, comprising:

an intake air quantity adjusting device for adjusting an intake air quantity of the engine;

an igniting device for igniting a fuel supplied to the engine;

a catalyst included in an exhaust system of the engine; and a controller configured to control the intake air quantity adjusting device and the igniting device, wherein the controller:

sets an ignition timing of the igniting device to a basic ignition timing at or following a compression top dead center time when the engine is operating in an idle state and a request is made to raise a temperature of the catalyst;

calculates a target value of the intake air quantity in accordance with an engine request torque when the ignition timing of the igniting device is set to the basic ignition timing;

calculates a limit value of the intake air quantity in accordance with a rate of increase of exhaust temperature;

compares the target intake air quantity with the limit intake air quantity;

controls the intake air quantity adjusting device so that the intake air quantity becomes the target value when the target value is less than the limit value and while the ignition timing is set to the basic ignition timing; and sets the ignition timing towards a spark advance side from the basic ignition timing based on a difference between the target value and the limit value when the target value is greater than the limit value and while the intake air quantity adjusting device is controlled to set the intake air quantity to become the limit value.

4. The control system according to claim 3, wherein the larger the difference between the target value and the limit value, the further the controller sets the ignition timing towards the spark advance side from the basic ignition timing.

5. The control system according to claim 3, further comprising:
a brake booster configured to reduce an operational force of a brake pedal with an intake negative pressure of the engine being a servo source;
wherein the larger a request negative pressure of the brake booster, the smaller the limit value.

6. The control system according to claim 1, further comprising:
a speed detecting device for detecting a rotational speed of the engine,
wherein the target value is set so that the rotational speed of the engine matches a target idle rotational speed.

7. The control system according to claim 1, wherein:
the engine is a direct-cylinder-fuel-injection engine comprising a fuel injection valve that directly supplies the fuel into a combustion chamber of the engine; and
wherein a fuel supply timing of the fuel injection valve comprises a first fuel supply timing performed during one of an intake stroke and a compression stroke, and a second fuel supply timing performed during the compression stroke and prior to the ignition timing.

8. The control system according to claim 1, wherein the higher a request exhaust temperature that is set on the basis of a water temperature of the engine, the larger the limit value.

9. The control system according to claim 8, wherein the higher the request exhaust temperature is set, the lower the water temperature of the engine.

10. The control system according to claim 1, wherein:
the engine is a direct-cylinder-fuel-injection engine comprising a fuel injection valve that directly supplies the fuel into a combustion chamber of the engine; and
wherein a fuel supply timing of the fuel injection valve is set to be immediately prior to the ignition timing of the igniting device.

11. The control system according to claim 10, wherein a fuel supply timing of the fuel injection valve is set to be immediately prior to the basic ignition timing.

12. An idle control system of an engine, comprising:
intake air quantity adjusting means for adjusting an intake air quantity of the engine;
temperature rise controlling means for setting an ignition timing to a basic ignition timing at or following a compression top dead center time, and for setting a fuel injection timing following the compression top dead center time and before the basic ignition timing, when the engine is operating in an idle state and a request is made to raise a temperature of a catalyst;
target intake air quantity setting means for calculating an engine request torque and setting a target value of the intake air quantity in accordance with the engine request torque;
limit value setting means for setting an upper limit value of the intake air quantity that is set to prevent an excessive rise in exhaust temperature;
intake air quantity controlling means for controlling the intake air quantity adjusting means so that the intake air quantity becomes the target value when the target value is less than the limit value in controlling the temperature rise, and for controlling the intake air quantity adjusting means so that the intake air quantity becomes the limit value when the target value is greater than the limit value in controlling the temperature rise; and
ignition timing controlling means for setting the ignition timing to be the basic ignition timing when the target value is less than the limit value in controlling the temperature rise, and for correcting the ignition timing towards a spark advance side from the basic ignition timing on the basis of insufficient air quantity when the target value is greater than the limit value in controlling the temperature rise.

13. The control system according to claim 12, wherein the larger the difference between the target value and the limit value, the further the ignition timing controlling means sets the ignition timing towards the spark advance side from the basic ignition timing.

14. The control system according to claim 12, further comprising:
a brake booster configured to reduce an operational force of a brake pedal with an intake negative pressure of the engine being a servo source;
wherein the larger a request negative pressure of the brake booster, the smaller the limit value.

15. The control system according to claim 12, further comprising:
speed detecting means for detecting a rotational speed of the engine,
wherein the target-value is set so that the rotational speed of the engine matches a target idle rotational speed.

16. The control system according to claim 12, wherein:
the engine is a direct-cylinder-fuel-injection engine comprising a fuel injection valve that directly supplies the fuel into a combustion chamber of the engine; and
wherein the fuel injection timing is set to be immediately prior to the ignition timing.

17. The control system according to claim 12, wherein the higher a request exhaust temperature that is set on the basis of a water temperature of the engine, the larger the limit value.

18. The control system according to claim 17, wherein the higher the request exhaust temperature is set, the lower the water temperature of the engine.

* * * * *